UNITED STATES PATENT OFFICE.

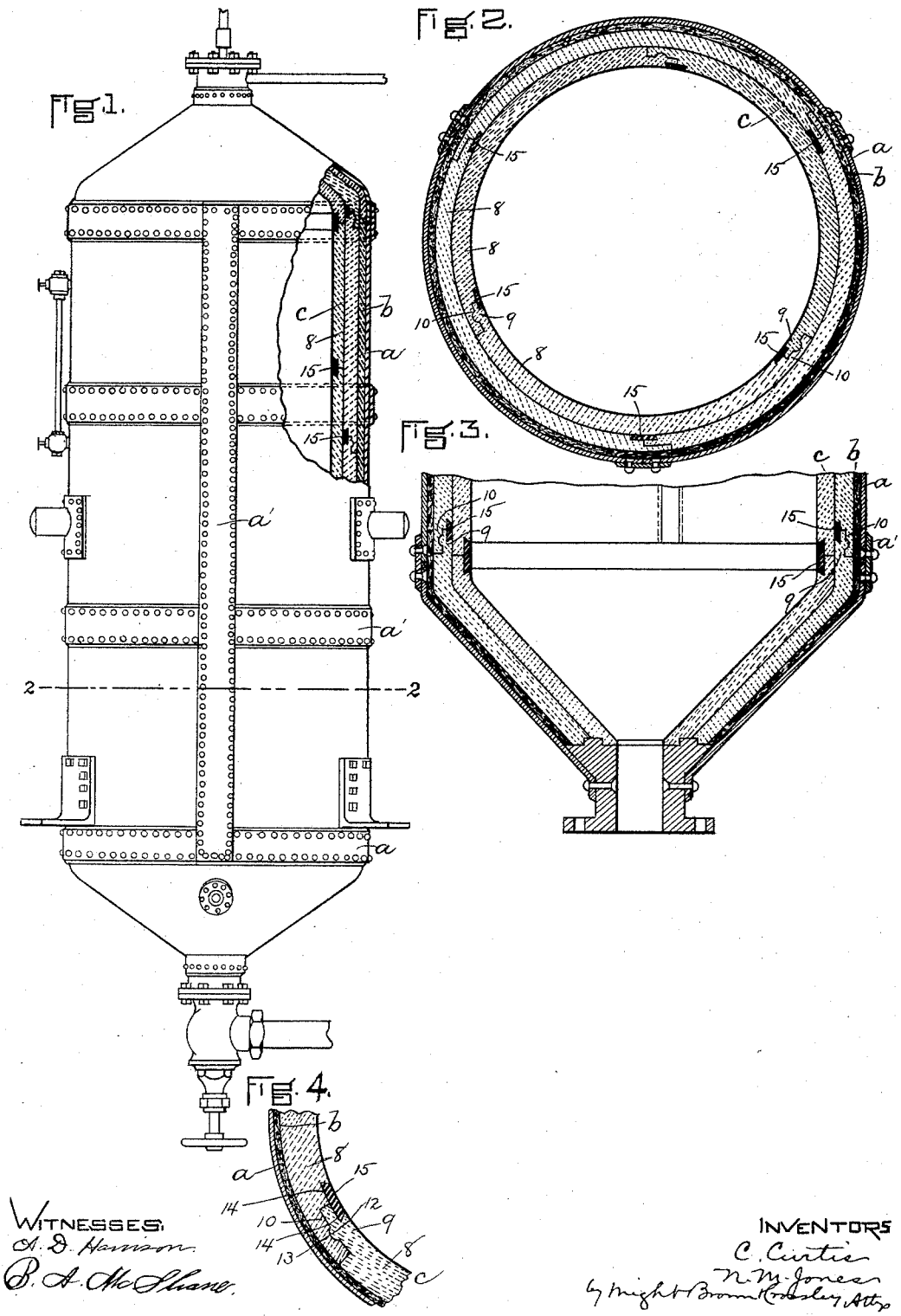

CHARLES CURTIS, OF NEWTON, MASSACHUSETTS, AND NATHANIEL M. JONES, OF BANGOR, MAINE.

PAPER-PULP DIGESTER.

SPECIFICATION forming part of Letters Patent No. 484,999, dated October 25, 1892.

Application filed December 19, 1891. Serial No. 415,656. (No model.)

*To all whom it may concern:*

Be it known that we, CHARLES CURTIS, of Newton, in the county of Middlesex and State of Massachusetts, and NATHANIEL M. JONES, of Bangor, in the county of Penobscot and State of Maine, have invented certain new and useful Improvements in Paper-Pulp Digesters, of which the following is a specification.

This invention relates to digesters for cooking wood chips in the manufacture of paper-pulp, and has for its object to provide such a construction as will protect the metal shell of the digester against the acid solutions employed to dissolve the resins and gums of the wood.

To these ends the invention consists in the pulp-digester comprising the construction as hereinafter described and claimed.

Of the accompanying drawings, forming part of this specification, Figure 1 represents a side elevation, partly in section, of a digester provided with my improvements. Fig. 2 represents a section on line 2 2, Fig. 1. Fig. 3 represents a vertical section of the bottom portion of the digester. Fig. 4 represents a partial horizontal section showing the lining made in one thickness or layer.

The same letters and numerals of reference indicate the same parts in all the figures.

In the drawings, *a* represents the shell of a digester, which is preferably of cylindrical form and composed of any suitable metal, such as iron, steel, phosphor-bronze, brass, &c. We prefer to make the shell of plates having butt-joints, the edges of the plates abutting against each other instead of overlapping, and being held by external plates or bands *a'*, to which the plates are riveted. This construction gives the shell a smooth interior, free from projections, and enables the intermediate and cement lining, hereinafter described, to be closely fitted to the interior of the shell.

*b* represents an intermediate lining, which is preferably composed of asbestus and cement made into a plastic composition and applied to the inner surface of the shell in a plastic state, its object being to protect the inner cement lining, hereinafter described, and to prevent contact of the acid solution with the metal shell in the event of leakage through the cement lining.

*c* represents the cement lining, which is composed, preferably, of Portland cement and ground glass or quartz, with or without a percentage of soluble glass. We do not limit ourselves to this composition, however, and may use any other cement or composition.

We show the cement lining as constructed in sections 8 8, which are provided at their edges with tongues 9 and recesses 10, the tongues of each section entering the recesses of the adjacent sections, so that the sections overlap at their joints. We prefer to form on the back side of each tongue 9 a rib or projection 12, entering a corresponding groove 13 in the surface of the recess 10, into which the tongue 9 enters. The inner surfaces of the sections 8 8 are provided with recesses 14 14, which collectively form a dovetail recess extending in both directions from the seam between each section and adapted to receive a packing or joint-covering strip 15 of lead, cement, or any other suitable material. We prefer to interpose packings between the surfaces of the tongues 9 and recesses 10, said packings being either of lead or cement.

It will be seen that the joint-coverings 15, the tongues 9, the recesses 10, and the packings between said tongues and recesses make the joints between the different sections extremely secure and reduce to the minimum the liability of the acid solution finding its way through the cement lining. To further reduce this liability we may make the cement lining in two layers, as shown in Figs. 1, 2, and 3, each layer being composed of sections formed as above described, the joints of the sections composing the inner layer alternating with those of the sections composing the outer layer, as shown in Figs. 1 and 2, so that in the event of leakage between the joints of the sections of the inner layer the acid would meet a solid portion of the outer layer. We do not limit ourselves to the particular form of the meeting edges of the sections here shown, but may give said sections any other suitable form, and provide any other suitable means for packing and making acidproof joints.

In Fig. 3 we show the lining of the bottom of the digester as formed in one piece; or, rather, each layer of said lining is formed in one piece, said pieces fitting the shape of the shell at the bottom of the digester. The inner layer of the bottom lining has a recess at its upper edge to receive the lower part of a packing or joint-covering 15, which covers the joint between the inner layer of the bottom-lining and the bottom sections of the inner layer of the lining of the body of the digester. The outer layer of the bottom-lining is shown as provided with a tongue 9 of the form above described, fitting the recess 10 in the lower end of the outer layer of the lining of the body of the digester.

When the lining of the bottom of the digester is formed as immediately above described, one way in which the digester may be built up is by first putting the plates of the shell together with the exception of the dome. Then the lining of the bottom may be put in place and the sections of the sides placed inside the shell, and the lining of the dome and the dome itself finally secured in position.

When the cement lining is made in two layers, a layer of cement, lead, or other suitable material may be interposed between said cement layers.

We do not limit ourselves in all cases to the use of the intermediate lining b, and may place the cement lining directly against the inner surface of the metal shell, or may interpose between the inner cement lining and shell only a coating of cement.

We claim—

1. A pulp-digester comprising a metal shell and a cement lining composed of an outer and an inner layer, both layers being made of sections formed to overlap at their edges, the inner and outer sections being of substantially-uniform size and shape and all laid flatwise with the joints of the inner layer alternating with those of the outer layer, as set forth.

2. A pulp-digester comprising a metal shell and a carbonized cement lining composed of sections having tongues and recesses at their edges, the sections having their inner surfaces recessed to form packing-receiving grooves or seats adapted to hold packings or joint-protectors across the seams or joints formed by the sections, as set forth.

In testimony whereof we have signed our names to this specification, in the presence of two subscribing witnesses, this 16th day of December, A. D. 1891.

CHARLES CURTIS.
NATHANIEL M. JONES.

Witnesses:
C. F. BROWN,
A. D. HARRISON.